United States Patent [19]

Valdez

[11] Patent Number: 4,565,256
[45] Date of Patent: Jan. 21, 1986

[54] UNIVERSAL BATTERY HOLDDOWN
[75] Inventor: Henry R. Valdez, Carson, Calif.
[73] Assignee: Mr. Gasket Company, Cleveland, Ohio
[21] Appl. No.: 493,325
[22] Filed: May 10, 1983
[51] Int. Cl.⁴ .............................................. B62D 25/00
[52] U.S. Cl. .................................... 180/68.5; 24/301; 248/503
[58] Field of Search ....................... 180/68.5; 248/503; 224/902; 24/522, 524, 525, 569, 68 R, 68 CD, 371, 300, 301

[56] References Cited
U.S. PATENT DOCUMENTS 3,752,254  8/1973  Carley ................................ 180/68.5
4,133,080  1/1979  Kuk ...................................... 24/301
4,367,572  1/1983  Zielenski ............................. 248/503

Primary Examiner—Joseph F. Peters, Jr.
Assistant Examiner—Everett G. Diederiks, Jr.
Attorney, Agent, or Firm—Roylance, Abrams, Berdo & Goodman

[57] ABSTRACT

An elastomeric battery holddown strap is formed to include two edge brackets joined by a rectangular strip, the edge brackets having triangular gussets to increase the stiffness thereof. An insert is installed into each edge bracket for receipt of hold down fasteners tying the battery to the structure of the car, the compliant form of the rectangular joining strip allowing for any necessary alignment to accommodate all variants of battery venting.

20 Claims, 5 Drawing Figures

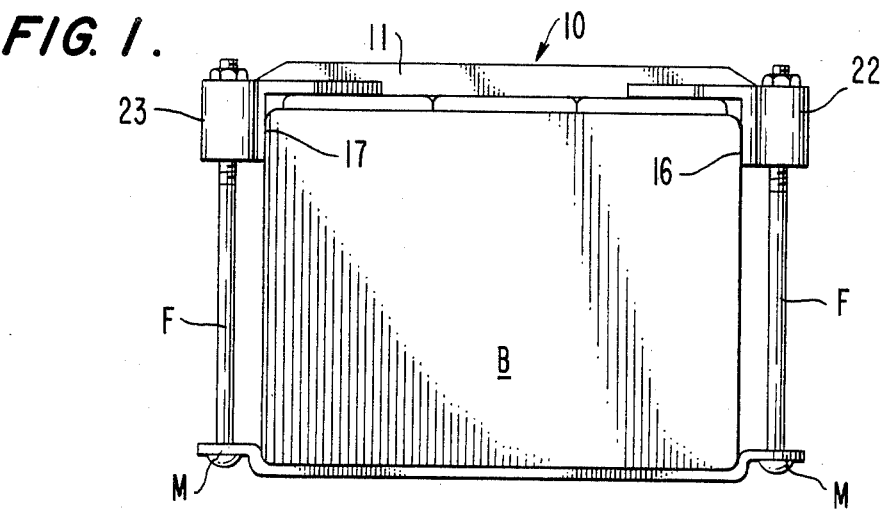
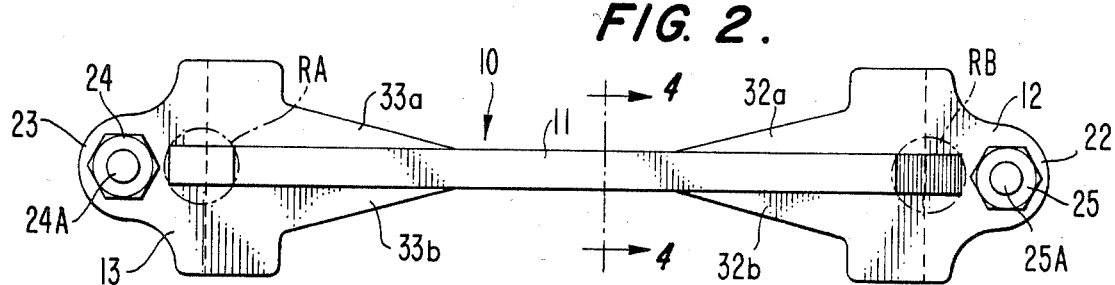
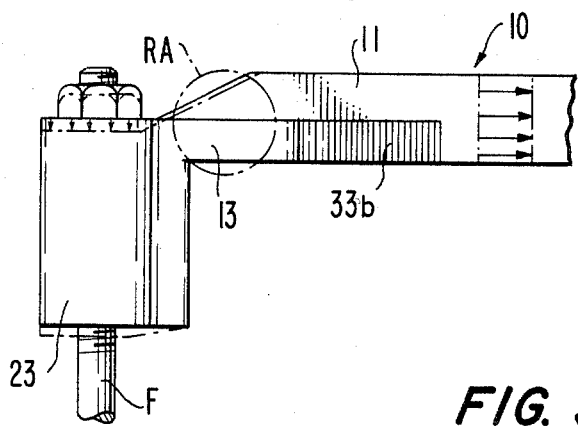
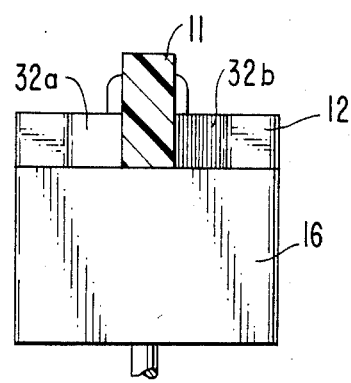
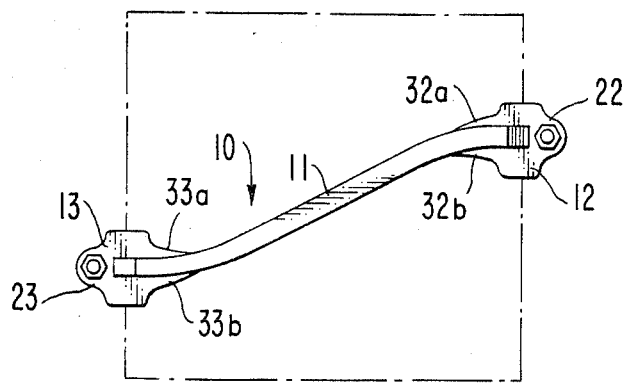

UNIVERSAL BATTERY HOLDDOWN

BACKGROUND OF THE INVENTION

1. Field of the Invention

The present invention relates to battery holddown fixtures, and more particularly to resilient holddown structures for attenuating shock and for conforming to various battery venting arrangements.

2. Description of the Prior Art

Battery holddowns for attaching storage batteries to the body of a motor vehicle have been known in the past. Typically such holddowns are specifically designed for the battery configuration then in existence, adapted to connect to the adjacent vehicle structure and conformed as a rigid member with very little compliance in the shape thereof. Recently, however, batteries of the 'maintenance free' configuration have been devised for substitution for the original batteries, characterized by a great variety of venting arrangements which, because of the fixed holddown configurations, are difficult to secure.

One specific example of this installation difficulty will be found in a brochure entitled "Hold-Down Modifications Manifold Vent Automotive Batteries" PS-5685, Gould, Inc. Automotive Battery Division, P.0. Box 43140, St. Paul, Minnesota. As indicated in this brochure substantial cutting and reforming of the hold down structure is entailed in the course of securing of the Gould Calcium Plus (TM) maintenance free battery.

In addition to this lack of universal adaptability the prior art hold downs also entail rigid structural contact thus enhancing the transfer of the higher frequency components of road shock into the battery with possible consequent damage to the plates. Accordingly, for both the foregoing aspects the use of rigid hold downs presents some undesirable results and a resilient hold down of an accommodating configuration is both desired and necessary in the marketplace. It is one such resilient hold down that is disclosed herein.

SUMMARY OF THE INVENTION

Accordingly, it is the general purpose and object of the present invention to provide a resilient battery hold down which, by the geometry thereof, will develop restraining forces at the battery edges.

Further objects of the invention are to provide a battery holddown conformed to attenuate mechanical shock transfer into the battery.

Yet additional objects of the invention are to provide a resilient battery hold down adapted to conform to various installations.

Briefly, these and other objects are accomplished within the present invention in a hold down generally conformed as an elongate strap of rectangular section extending between two angulated edge engaging brackets each provided with a vertical bore proximate the exterior surface thereof. Both the strap and the brackets may be formed of a resilient material structure, such as natural or synthetic rubber, neoprene or similar elastomer having hysteresis in the elastic deformation thereof, the vertical bores being formed in inserts for spreading force over a larger area. In this form the spacing between the opposed faces of the angulated brackets is just slightly less than the typical width of the battery retained to develop tensile forces in the strap in the course of installation.

In order to increase shear compliance relative the vertical bores the exterior vertical surface of each bracket is conformed as a semicircle about each insert and will thus deform upon the tensioning of any hold down fasteners. Similarly the juncture of each bracket with the joining strap is enlarged by way of triangular, gusset like surfaces thus enlarging the lateral surface while concurrently the vertical dimension of the strap in the juncture region is reduced. Thus the root attachment of the strap relative the brackets is geometrically stiffened in a horizontal plane while vertical compliance is provided. It is to be understood that while the foregoing structure is described by reference to various parts such is for explanation only, it being intended that the brackets and strap be formed as a single elastomeric structure with the inserts of a stiffer material.

BRIEF DESCRIPTION OF THE DRAWINGS

FIG. 1 is a side view of the inventive battery hold down in its operative installation;

FIG. 2 is a top view of the hold down shown in FIG. 1;

FIG. 3 is a side view detail illustrating the elastic deformation of the inventive hold down;

FIG. 4 is a sectional end view taken along line 4—4 of FIG. 2.

FIG. 5 is yet another top view illustrating a deflected arrangement of the present hold down for accommodating various battery venting schemes; and

DESCRIPTION OF THE SPECIFIC EMBODIMENT

As shown in FIGS. 1, 2 and 3 the inventive battery hold down, generally designated by the numeral 10, comprises an elongate center strap 11 extending between two right angle edge brackets 12 and 13 spaced relative each other to present opposedly facing surfaces 16 and 17 at a separation just smaller than the width of a battery B. Each of the edge brackets 12 and 13 is furthermore provided with, at the distal surfaces thereof, with a semicircular, vertically aligned, enlargement shown as enlargements 22 and 23 respectively, each enlargement being sectionally dimensioned to receive corresponding inserts 24 and 25 which, in turn, include fastener bores 24a and 25a through which bolts, screws or other fastening devices F may be passed. These fasteners then draw the ends of hold down 10 against the battery B towards mounting structures M in the vehicle, to develop a prestress in the holddown and the casing of the battery.

It is contemplated that the foregoing combination of strap 11 and brackets 12 and 13 be formed as a single unit by way of any convenient process like casting or molding, of an elastomeric material structure having hysteresis in the elastic deformation thereof. In this form any response of this unit to dynamic load will be accompanied by internal hysteresis losses which thus absorb the energy transfer into the battery.

In more detail the end brackets 12 and 13 are each provided with triangular webs 32a and 32b and 33a and 33b extending from the vertical surfaces along horizontal planes to join with the center strap 11. These gusset-like structures expand the root section of the strap where it joins the end brackets to fix the direction of departure thereof relative to the battery edges. In the vertical plane, as shown in FIGS. 3 and 4, the strap 11 extends partly over the webs 32a and 32b and 33a and 33b in the form of a rectangular spine tapering into the web surface at each end towards the inserts 24 and 25. As result of this taper a relatively low area moment of inertia bending section is formed in regions RA and RB allowing for extended flexure at these points. As thus formed the hold down 10 may then be prestressed through the stretching of strap 11 and the bending and shear deformation of the end brackets 12 and 13 with a concurrent prestress of the resilient battery case retained thereby, as shown in FIG. 3. Any dynamic loading will thus increase or relieve this prestress, within the elastic region of the hold down, transforming the dynamic loads into hysteresis losses.

As shown in FIG. 5 the foregoing hold down structure conveniently accommodates various venting arrangements, the lateral flexure of strap 11 being geometrically rendered compliant for transverse alignment. Thus the foregoing hold down is useful in varying configurations of attachment, in all instances providing hysteresis for energy absorption. The resulting structure may be best formed through the use of room temperature vulcanising (RTV) silicone rubber, polyurethane elastomers, latex (gum rubber), or other polysulfide liquid polymers thus being conveniently produced through inexpensive molding processes.

Thus newly developed replacement batteries are easily accommodated by this after market device which, because of its inexpensive character and energy absorbing features, is easily vended.

Obviously many modifications and changes may be made to the foregoing description without departing from the spirit of the invention. It is therefore intended that the scope of the invention be determined solely on the claims appended hereto.

What is claimed is:

1. An elastomeric holddown for a battery comprising:
an elongate center strap of an elastomeric material formed with L-shaped brackets on both ends thereof, said brackets being spaced apart, the spacing between said brackets being less than the width of said battery, webs partially joining said brackets to said strap adjacent the ends of said strap, said webs being spaced along said center strap; and
said brackets including means to receive battery support apparatus.

2. A battery holddown according to claim 1 wherein: the cross-sectional area of said center strap tapers towards the surface of said webs proximate the ends thereof.

3. A holddown according to claim 1 wherein said center strap has a rectangular cross section throughout its length.

4. A holddown according to claim 1 wherein said center strap, said brackets and said webs are integrally formed.

5. A holddown according to claim 1 wherein said brackets include a cylindrical portion, said cylindrical portion being opposite the center strap.

6. A holddown according to claim 1 wherein said webs diminish in width from the end brackets along the center strap.

7. A holddown according to claim 6 wherein said webs comprise two pairs of web portions, one pair of said web portions being located adjacent each end of said center strap, said two web portions of each pair being located on opposite sides of said center strap.

8. A holddown according to claim 7 wherein the web portions are triangular.

9. A holddown according to claim 8 wherein the web portions are oriented parallel to the longitudinal direction of the center strap.

10. An elastomeric holddown device for a battery comprising:
first and second spaced end brackets, said brackets having means to receive battery retaining means and portions designed to abut said battery to retain the battery in place,
a center strap, said center strap extending between the end brackets, the ends of said center strap terminating at said brackets, and
web means which extend from the outer edges of each of said brackets to said center strap, said web means being spaced apart along said center strap,
whereby said device may be flexed along the longitudinal axis of the center strap to orient the end brackets in various relative positions.

11. A holddown device according to claim 10 wherein said portions include a first surface designed to abut the top of the battery and a second surface designed to abut a side surface of the battery, said second surfaces being approximately parallel,
whereby when said brackets are positioned in various relative positions, the second surfaces remain in an approximately parallel relationship.

12. A holddown device according to claim 10 wherein said center strap tapers in cross-sectional area at its ends.

13. A holddown device according to claim 12 wherein the cross section of said center strap is rectangular along its entire length.

14. A holddown device according to claim 13 wherein the center strap is designed to be flexed perpendicular to its axis and adjacent its ends so that the brackets may be placed into engagement with the battery.

15. A holddown device according to claim wherein said end brackets, said center strap and said webs are integrally formed.

16. A holddown device according to claim 15 wherein said webs means diminish in width from the outer edges of the end brackets along the center strap.

17. An elastomeric holddown device for a battery comprising:
first and second spaced end brackets, said end brackets having means to receive battery retaining means and portions designed to abut the top and sides of said battery to retain the battery in place,
a center strap, said center strap extending between the end brackets, the ends of said center strap terminating at said brackets, said center strap tapering in cross-sectional area at its ends,
whereby the center strap may be flexed perpendicularly to its axis to place the brackets in abutment with the sides of the battery.

18. A holddown device according to claim 17 further comprising:
web means which extend from the outer edges of each of said brackets to said center strap, said web means being spaced apart along said center strap,
whereby said device may be flexed along the longitudinal axis of the center strap to orient the end brackets in various relative positions.

19. A holddown according to claim 18 wherein said end brackets, center strap and web means are integrally formed.

20. A holddown according to claim 19 wherein said web means diminish in width from the outer edges of the end brackets along the center strap.

* * * * *

Disclaimer 4,565,256.—*Henry R. Valdez*, Carson, Calif. UNIVERSAL BATTERY HOLDOWN. Patent dated Jan. 21, 1986. Disclaimer filed Mar. 29, 1989, by the assignee, Mr. Gasket Co.

Hereby enters this disclaimer to the entire term of said patent.
*[Official Gazette May 23, 1989]*